(12) United States Patent
Burdass

(10) Patent No.: US 7,613,911 B2
(45) Date of Patent: Nov. 3, 2009

(54) PREFETCHING EXCEPTION VECTORS BY EARLY LOOKUP EXCEPTION VECTORS WITHIN A CACHE MEMORY

(75) Inventor: Andrew Burdass, Ely (GB)

(73) Assignee: ARM Limited, Cambridge (GB)

( * ) Notice: Subject to any disclaimer, the term of this patent is extended or adjusted under 35 U.S.C. 154(b) by 1178 days.

(21) Appl. No.: 10/798,890

(22) Filed: Mar. 12, 2004

(65) Prior Publication Data

US 2005/0204121 A1    Sep. 15, 2005

(51) Int. Cl.
*G06F 7/38* (2006.01)
*G06F 9/00* (2006.01)
*G06F 9/44* (2006.01)
*G06F 15/00* (2006.01)

(52) U.S. Cl. .................................... 712/244
(58) Field of Classification Search ................ 712/244
See application file for complete search history.

(56) References Cited

U.S. PATENT DOCUMENTS

| | | | | |
|---|---|---|---|---|
| 5,481,685 A | * | 1/1996 | Nguyen et al. ............. | 712/244 |
| 5,784,602 A | * | 7/1998 | Glass et al. ................ | 712/220 |
| 5,966,529 A | * | 10/1999 | Sollars ..................... | 712/228 |
| 6,240,531 B1 | * | 5/2001 | Spilo et al. ................ | 714/38 |
| 6,282,636 B1 | * | 8/2001 | Yeh et al. .................. | 712/218 |
| 6,978,350 B2 | * | 12/2005 | Birk et al. ................. | 711/133 |

* cited by examiner

*Primary Examiner*—Eddie P Chan
*Assistant Examiner*—Corey S Faherty
(74) *Attorney, Agent, or Firm*—Nixon & Vanderhye P.C.

(57) ABSTRACT

An integrated circuit processor core 4 is provided with an instruction pipeline 20 along which program instructions advance. When an exception condition occurs part way through execution of a particular program instruction, then a prefetch of the exception handling program instruction corresponding to that exception is initiated before the currently executing program instruction has completed. In this way the exception handling program instruction is more rapidly available to start the exception processing. The early prefetch may involve performing a lookup in a cache memory 6 and any necessary linefill upon a miss. In addition, the exception handling program instruction amy also be fed into the instruction pipeline 20 before an instruction boundary is reached.

14 Claims, 3 Drawing Sheets

PREFETCHING EXCEPTION VECTORS BY EARLY LOOKUP EXCEPTION VECTORS WITHIN A CACHE MEMORY

BACKGROUND OF THE INVENTION

1. Field of the Invention

This invention relates to the field of data processing systems. More particularly, this invention relates to the initiation of exception processing within data processing systems in response to the occurrence of an exception condition.

2. Description of the Prior Art

It is known to provide data processing systems with exception handling mechanisms. As an example, the processors designed by ARM Limited, Cambridge, England are responsive to external interrupt signals and exception and abort conditions to trigger exception processing. Such exception processing in this example system involves a switch of processor state into an exception handling mode with the existing state being saved. An exception vector is associated with the jump to the exception handling mode and serves to point to an exception handling routine. When the exception has been processed, exception handling is terminated and a switch is made back to the original mode with the original context being restored.

An important characteristic of many data processing systems, such as real time data processing systems, is their interrupt latency. In some systems it is critical that the system responds to an interrupt condition as quickly as possible. As an example, in an automotive application, a processor controlling an anti-lock braking system may need to respond rapidly to an interrupt signal indicating occurrence of a dangerous condition and the associated interrupt latency is the maximum time taken to initiate processing of the interrupt under all conditions. The interrupt latency assumes the worst-case in which the initiation of interrupt processing will be delayed for the longest time. Measures which can increase the speed of initiation of interrupt processing and reduce the interrupt latency are strongly advantageous.

It is know within high performance data processors to utilise a technique termed branch prediction. With this technique, branch instructions occurring in a program instruction stream are recognised before they are executed within the instruction pipeline and a prediction is made as to whether or not the branch involved will or will not be taken. The instruction prefetch unit is responsive to this prediction to fetch subsequent instructions from either the next following memory location or from the branch target location. If the prediction is correct, then this saves time as the correct instructions will have been prefetched and loaded into the instruction pipeline. The alternative may be, for example, that a branch instruction proceeds along the pipeline with following instructions being prefetched sequentially. When that branch instruction is reached and executed, the branch is taken and it is found that the incorrect instructions have been prefetched into the instruction pipeline requiring these incorrect instructions to be flushed out and a time penalty incurred due to the fetching of the correct instructions from the branch target. The branch instruction may be removed from the instruction stream when its behaviour has been predicted with a check being made to ensure that the conditions associated with the prediction did occur at the point at which the branch instruction would have been executed.

SUMMARY OF THE INVENTION

Viewed from one aspect the present invention provides an apparatus for processing data, said apparatus comprising:

an instruction pipeline operable to hold a plurality of program instructions at respective different stages of instruction processing, an execution stage of said instruction pipeline serving to execute a current program instruction held at said execution stage;

an instruction prefetch unit operable to fetch program instructions from a memory system to said instruction pipeline; and an exception controller responsive to an exception signal to trigger exception processing by forcing program execution starting from an exception handling program instruction stored at a predetermined memory location; wherein upon receipt of said exception signal part way through execution of said current program instruction, said exception controller is operable to trigger said instruction prefetch controller to start fetching of said exception handling program instruction from said memory system prior to completion of execution of said current program instruction.

The invention recognises that in the highly time critical environment of responding to exceptions, the normal practice of waiting until an instruction boundary has been reached to initiate the fetching of exception handling code is a significant disadvantage. Having recognised this bottleneck, the technique proposes initiating a prefetch of the exception handling code as soon as the exception occurs without waiting for completion of the currently executing instruction. In practice the cases where such a speculative prefetch are inappropriate (e.g. when the architecturally defined point of the instruction boundary is reached, a different exception or a different course of action is needed) are sufficiently rare that the performance advantages of this technique significantly outweigh the extra time and circuit complexity that is required to deal with the situations in which the speculative prefetch is inappropriate.

The present instruction can be used in a wide variety of data processing systems where individual instructions may take different numbers of processing cycles to complete, but is particularly well-suited to situations in which at least some of the processing instructions can take a plurality of cycles to complete, and accordingly the time advantage of speculatively prefetching the exception handling code whilst the instruction concerned completes is significant. As an example of an alternative circumstance where the present technique may be useful is one in which the processor takes multiple cycles to place itself into a state where it is able to accept the exception (i.e. multiple cycles to "tidy up" its current state).

The exception handling program instruction itself may be part of the exception handling routine or may more typically be a vector pointing to the body of the exception handling code. Using exception handling vectors in this way is a convenient and flexible mechanism for supporting exception handling.

The fetching of the exception handling code from the memory system could take place from a variety of different types of memory systems. In typical high performance systems, a cache memory and a main memory are provided and the prefetch controller will trigger a cache line fill if a miss of a lookup within the cache for the exception handling program instruction occurs. The early triggering of a cache line fill is particularly advantageous as this would otherwise represent a significant potential delay in the initiation of exception handling and a disadvantageous increase in the interrupt latency for the worse case situation.

The exception signals could take a variety of different forms but the present technique is particularly well suited to handling interrupts.

As an alternative the exceptions may be one of a data abort or a prefetch abort.

The present technique is particularly well suited for use within a processor core, as opposed to a more general form of data processing system, and in particular within an integrated circuit environment.

Viewed from another aspect the present invention provides a method of processing data, said method comprising the steps of:

executing a current program instruction held at an execution stage of an instruction pipeline;

fetching program instructions from a memory system to said instruction pipeline; and in response to an exception signal, triggering exception processing by forcing program execution starting from an exception handling program instruction stored at a predetermined memory location; wherein upon receipt of said exception signal part way through execution of said current program instruction, starting fetching of said exception handling program instruction from said memory system prior to completion of execution of said current program instruction.

Viewed from a further aspect the invention provides an apparatus for processing data, said apparatus comprising:

a cache memory operable to store program instructions to be executed; and an exception controller responsive to an exception signal to trigger exception processing by forcing program execution starting from an exception handling program instruction stored at a predetermined memory location; wherein upon receipt of said exception signal part way through execution of a current program instruction, said exception controller is operable to trigger a lookup of said exception handling program instruction within said cache memory and if said exception handling program instruction is not present within said cache memory to trigger a cache linefill operation to read said exception handing program instruction from a main memory to said cache memory.

The execution controller may directly or indirectly trigger the lookup linefill, e.g. the exception control could trigger the prefetch unit to perform the lookup as this would allow more easy cache access arbitration.

Viewed from a further aspect the invention provides a method of processing data, said method comprising the steps of:

storing program instructions to be executed within a cache memory; and in response to an exception signal, triggering exception processing by forcing program execution starting from an exception handling program instruction stored at a predetermined memory location; wherein upon receipt of said exception signal part way through execution of a current program instruction, triggering a lookup of said exception handling program instruction within said cache memory and if said exception handling program instruction is not present within said cache memory to trigger a cache linefill operation to read said exception handing program instruction from a main memory to said cache memory.

The above, and other objects, features and advantages of this invention will be apparent from the following detailed description of illustrative embodiments which is to be read in connection with the accompanying drawings.

BRIEF DESCRIPTION OF THE DRAWINGS

Embodiments of the invention will now be described, by way of example only, with reference to the accompanying drawings in which.

DESCRIPTION OF THE PREFERRED EMBODIMENTS

Figure 1:
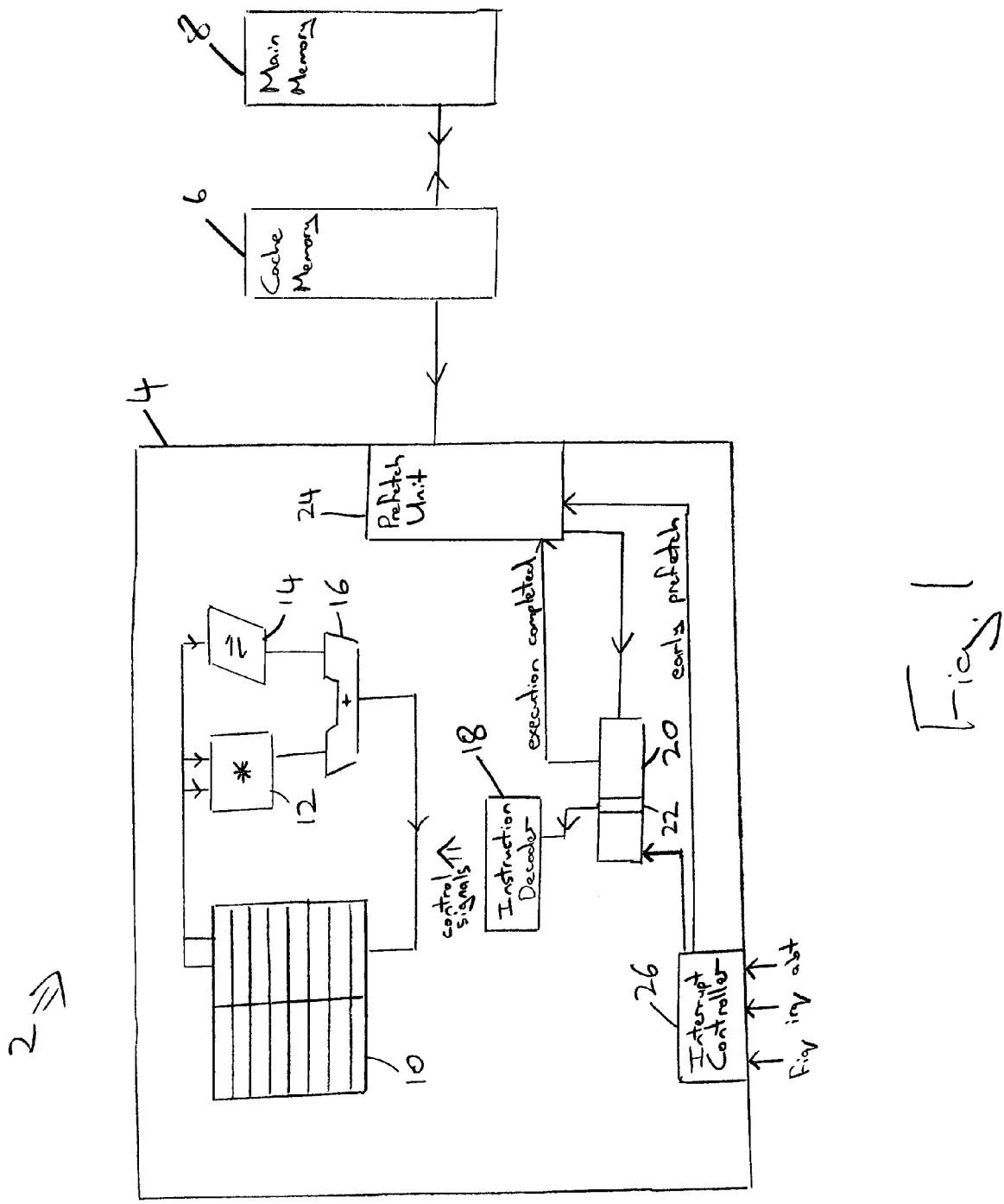
FIG. 1 schematically illustrates an integrated circuit processor utilising exception handling program instruction prefetching.

FIG. 1 illustrates a data processing system 2 including an integrated circuit processor core 4, a cache memory 6 and a main memory 8. The cache memory 6 and the main memory 8 provide a hierarchical memory system. The processor core 4 includes data processing circuits, such as a register bank 10, a multiplier 12, a shifter 14 and an adder 16. These data processing circuits 10, 12, 14 and 16 are controlled by control signals generated by an instruction decoder 18 which is responsive to program instructions passing along an instruction pipeline 20. The instruction pipeline 20 includes an execute stage 22 corresponding to the program instruction currently being executed by the processing circuits 10, 12, 14 and 16. It will be appreciated that certain processing instructions, such as long multiply-accumulate instructions may take several clock cycles to execute. Architecturally, exception handling is normally initiated at program instruction boundaries in order that there is a defined state of the processor core 4 which can be saved before exception handling takes place and later restored after exception handling has completed.

The processor core 4 includes an instruction prefetch unit 24 which serves to prefetch program instructions from the memory system 6, 8. Instruction prefetch units 24 per se are known in the technical field and the performance advantages associated with them in respect of normal processing are well known. The present technique modifies the behaviour of the instruction prefetch unit 24 by making it responsive to an early prefetch signal generated by an interrupt controller 26. The interrupt controller 26 is responsive to an interrupt signal, such as a fast interrupt signal fiq, a slow interrupt signal irq, or an exception signal, such as a prefetch or memory abort abt signal. The early prefetch signal triggers the instruction prefetch unit 24 to initiate a fetch of the exception handling program instruction corresponding to the exception which has occurred and been recognised by the interrupt controller 26. This exception handling program instruction is prefetched from the cache memory 6, or, if a cache miss occurs, by a line fill from the main memory 8 into the cache memory 6. The exception handling program instruction so prefetched is past to the instruction pipeline 20.

In some alternative embodiments the system may operate to perform a lookup of the required exception handling program instruction within the cache memory 6 and, upon a miss, to trigger any required linefill from the main memory 8 without the excpetion handling program instruction being fed into the instruction pipeline 20 at that stage. Early starting of any required linefill operation has an advantage in its own right independent of the early feeding of the exception handling program instruction into the instruction pipeline before an instruction boundary has been reached.

The instruction prefetch unit 24 waits until an execution completed signal is received from the instruction pipeline 20 indicating that the currently executing instruction within the execution stage 22, which was in the process of being executed when the exception occurred, has now completed its execution. In this circumstance if the exception which was signalled by the interrupt controller 26 as requiring an early prefetch is still current, then the prefetched exception handling program instruction is passed into the instruction pipeline 20 with preceding instructions being flushed therefrom. It will be appreciated that the execution completed signal may be generated before the exception handling program instruction which is being early prefetched has been returned. In this case, the interrupt latency will still have been decreased since the prefetching will have been initiated sooner than would have been the case if the system had waited until the instruction boundary before initiating the fetching of the exception handling program instruction. If the early prefetched exception handling program instruction is not the appropriate one in accordance with the exception which has the highest priority and is pending when the instruction boundary of the currently executing instruction is reached, then the system can be "repaired" by ignoring/suppressing the prefetched instruction and proceeding to fetch the exception handling program instruction indicated at the instruction boundary as that required.

Figure 2:
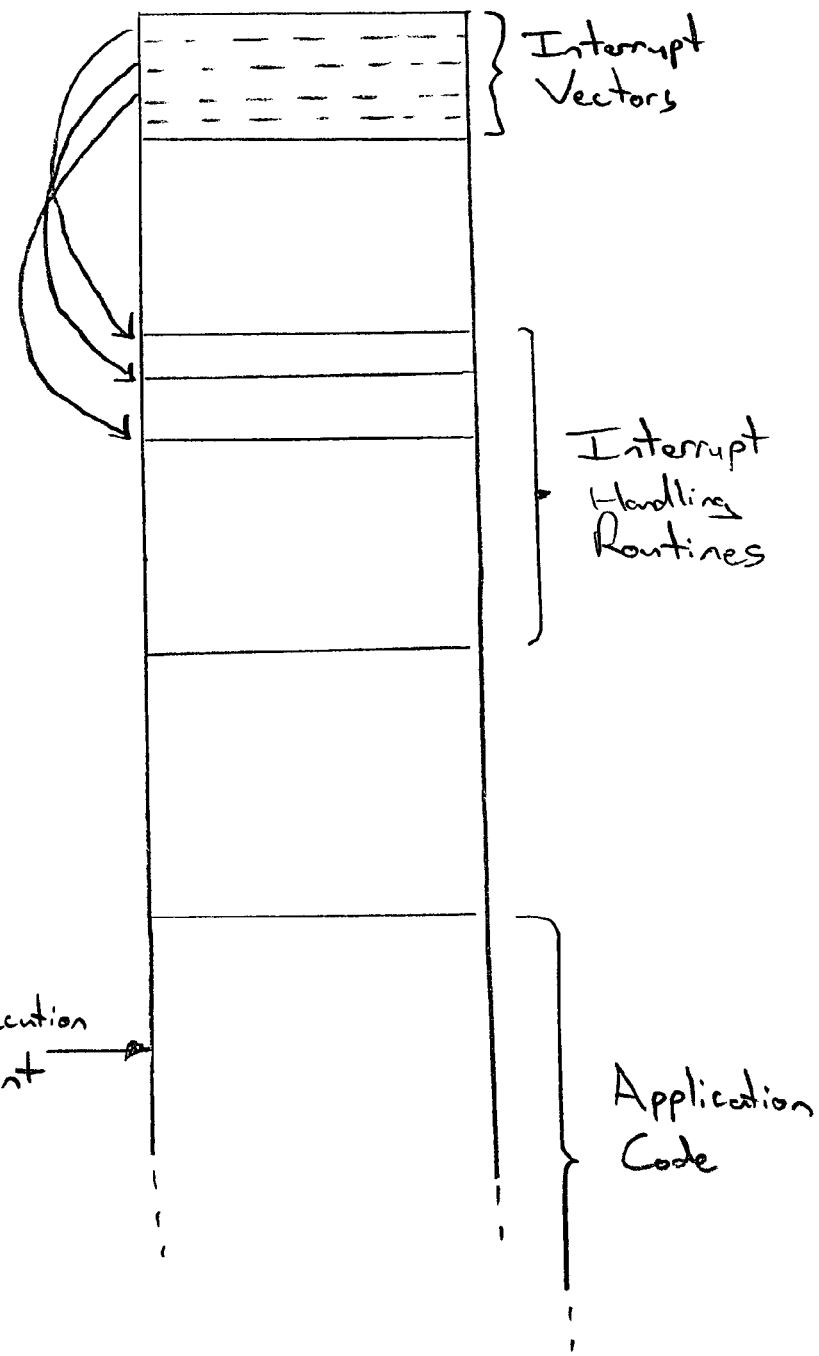
FIG. 2 schematically illustrates a memory map within the system of FIG. 1.

FIG. 2 illustrates a memory map of the memory system 6, 8. Different memory addresses within the memory serve to store different program instructions, and data to be manipulated. A common arrangement is for exception handling vectors (interrupt vectors) to be stored at the beginning of the memory space (other systems may choose the top of the memory space) with different locations being associated with different exception types. When an exception of a particular type occurs, then the instruction or address stored at the predetermined memory location concerned is used as a pointer to the main body of the respective exception handling routine. Also illustrated in FIG. 2 is the normal application code with its execution point advancing in accordance with the program counter of the processor core 4 as the application code normally executes. When an exception occurs, the execution point is diverted to the relevant one of the exception handling routines with a later return being made to the original execution point when the exception concerned has been processed.

Figure 3:
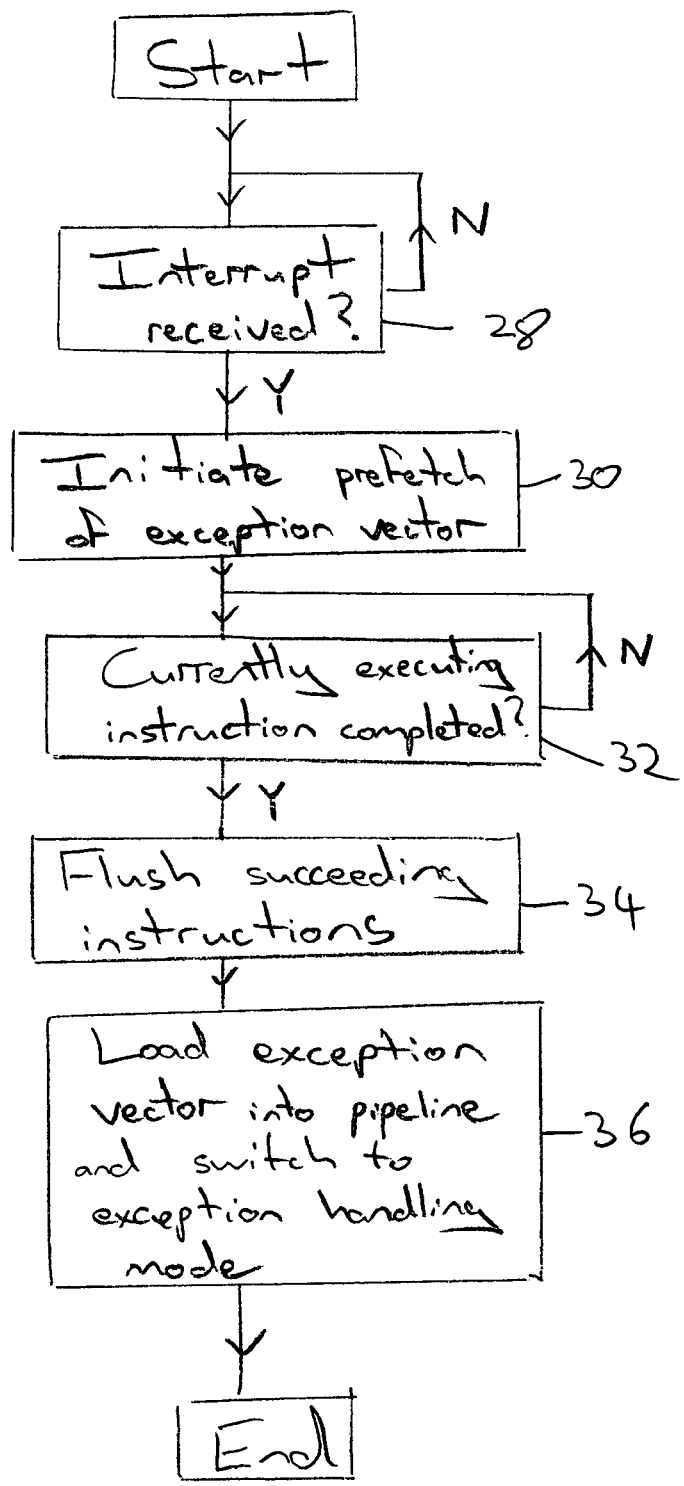
FIG. 3 is a flow diagram schematically illustrating exception handling within the system of FIG. 1.

FIG. 3 is a flow diagram schematically illustrating the operation of the circuit of FIG. 1. At step 28 the system waits for an interrupt to be received. When an interrupt has been received, then step 30 serves to immediately initiate a prefetch of the associated exception vector without waiting for the currently executing instruction to be completed. The processor core 4 will not be in an architecturally well defined state until the instruction boundary has been reached and so a context switch will not be possible, yet a significant advantage occurs by immediately prefetching the exception vector without waiting for the instruction boundary to be reached. Following the initiation of the prefetch of the exception vector at step 30, step 32 waits until the currently executing instruction has completed. When this has completed, step 34 serves to flush succeeding instructions out of the instruction pipeline 20 and step 36 loads the exception vector program instruction into the pipeline 20 and switches to the relevant exception handling mode. Processing of the exception then proceeds in the normal fashion with a later return being made to the instruction in the normal program flow following the one during execution of which the exception condition occurred.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:
    a cache memory operable to store program instructions to be executed;
    an instruction pipeline including an instruction prefetch unit; and
    an exception controller, responsive to an exception signal signaling an exception, for triggering exception processing by forcing program execution starting from an exception handling program instruction stored at a predetermined memory location; wherein upon receipt of said exception signal part way through execution of a current program instruction, said exception controller triggering a lookup of said exception handling program instruction within said cache memory and, if said exception handling program instruction is not present within said cache memory, triggering a cache linefill operation to read said exception handing program instruction from a main memory to said cache memory, and, upon completion of execution of said current program instruction, if said exception is still current, then said instruction prefetch unit fetches said exception handling program instruction from said cache memory.

2. Apparatus as claimed in claim 1, wherein execution of said current instruction lasts for a plurality of clock cycles and lookup of said exception handling program instruction within said cache memory starts part way through said plurality of clock cycles.

3. Apparatus as claimed in claim 1, wherein said exception handling program instruction redirects program execution to an exception handling routine.

4. Apparatus as claimed in claim 1, wherein said exception controller is an interrupt controller, said exception signal is an interrupt signal and said exception handling program instruction is and interrupt handling program instruction.

5. Apparatus as claimed in claim 1, wherein said exception is one of a data abort and a prefetch abort.

6. Apparatus as claimed in claim 1, wherein said cache memory and said exception controller are parts of a processor core.

7. Apparatus as claimed in claim 1, wherein said apparatus is an integrated circuit.

8. A method of processing data, said method comprising the steps of:
    storing program instructions to be executed within a cache memory;
    processing program instructions with an instruction pipeline including an instruction prefetch unit; and
    triggering, in response to an exception signal, exception processing by forcing program execution starting from an exception handling program instruction stored at a predetermined memory location; wherein, upon receipt of said exception signal part way through execution of a current program instruction, said triggering step includes triggering a lookup of said exception handling program instruction within said cache memory and, if said exception handling program instruction is not present within said cache memory, said triggering step includes triggering a cache linefill operation to read said exception handing program instruction from a main memory to said cache memory, and, upon completion of execution of said current program instruction, if said exception is still current, then said instruction prefetch unit fetches said exception handling program instruction from said cache memory.

9. A method as claimed in claim 8, wherein execution of said current instruction lasts for a plurality of clock cycles and lookup of said exception handling program instruction within said cache memory starts part way through said plurality of clock cycles.

10. A method as claimed in claim 8, wherein said exception handling program instruction redirects program execution to an exception handling routine.

11. A method as claimed in claim 8, wherein said exception signal is an interrupt signal and said exception handling program instruction is and interrupt handling program instruction.

12. A method as claimed in claim 8, wherein said exception is one of a data abort and a prefetch abort.

13. A method as claimed in claim 8, wherein said method is performed within a processor core.

14. A method as claimed in claim 8, wherein method is performed within an integrated circuit.

* * * * *